Oct. 16, 1951          M. R. POPE          2,571,483
APPARATUS FOR USE IN PLANTING SWEET POTATOES

Filed Sept. 9, 1946          2 Sheets-Sheet 2

Inventor
M. R. Pope

Patented Oct. 16, 1951

2,571,483

UNITED STATES PATENT OFFICE 2,571,483

APPARATUS FOR USE IN PLANTING SWEET POTATOES

Marion Roscoe Pope, Broken Bow, Okla.

Application September 9, 1946, Serial No. 695,713

1 Claim. (Cl. 47—32)

This invention relates to an apparatus designed to facilitate the planting of sweet potatoes.

It is common knowledge, during the planting of sweet potatoes, the sweet potatoes are planted at the usual depth, and when the sprouts appear, these sprouts are broken off and planted.

It is the object of the present invention to provide a means to be positioned over the sweet potatoes planted for sprouting, to prevent the sweet potatoes from being pulled from the soil when the sprouts are being removed.

Another object of the invention is to provide means for gauging the depth of planting the sweet potatoes to be sprouted, so that the best sprouting results will be insured.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawings.

Figure 1:
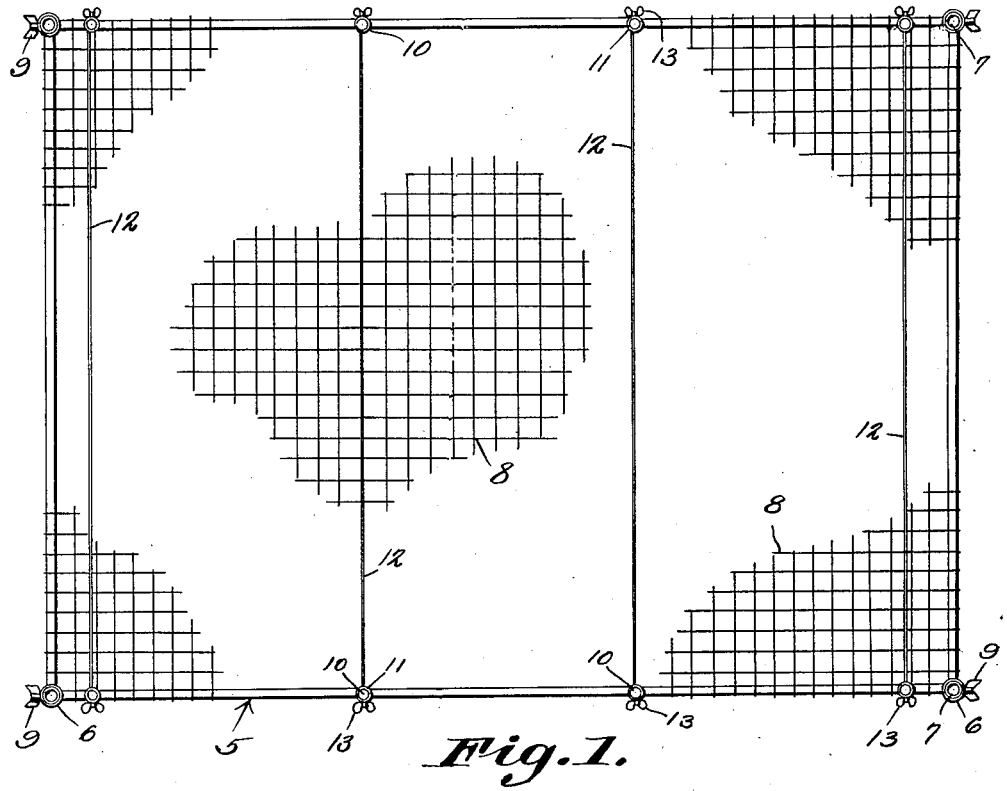
Figure 1 is a plan view of an apparatus, constructed in accordance with the invention.
Figure 2:
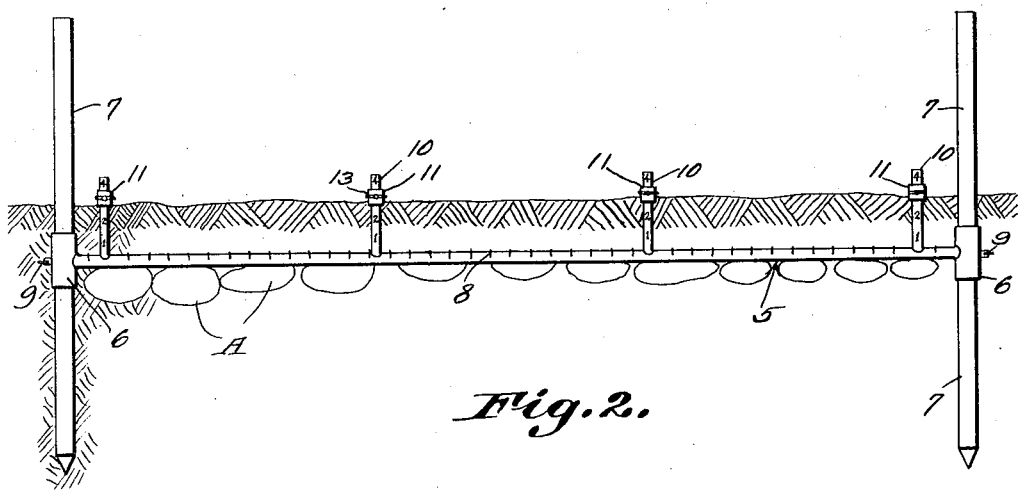
Figure 2 is a side elevational view, illustrating the apparatus as positioned over the said sweet potatoes, illustrating the relative location of the apparatus and sweet potatoes being sprouted.
Figure 3:
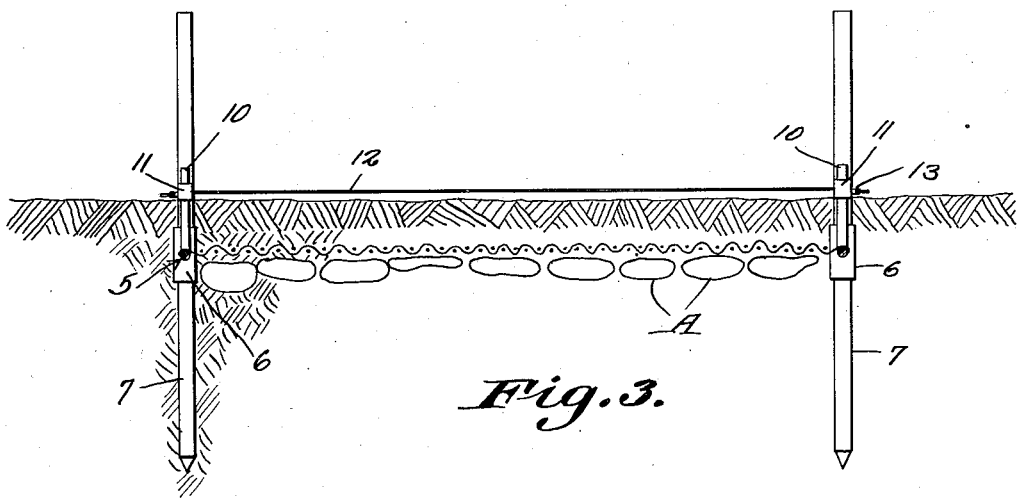
Figure 3 is a sectional view through the apparatus.
Figure 4:
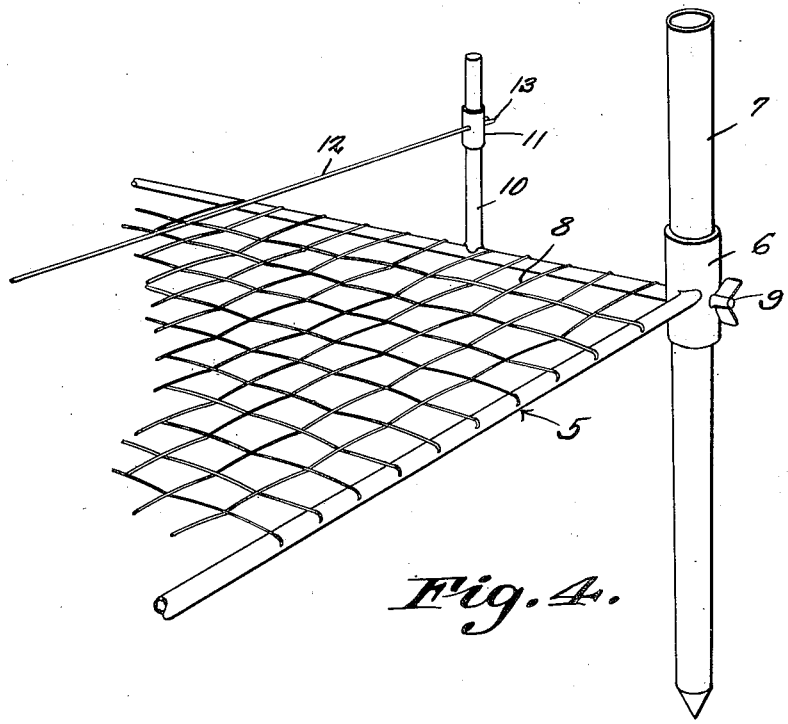
Figure 4 is an enlarged perspective view of one corner of the apparatus.

Referring to the drawings in detail, the apparatus comprises preferably a rectangular frame indicated generally by the reference character 5, the frame being provided with vertical tubular sections 6 at its corners, to be fitted over the corner posts 7, which have their lower ends pointed so that they may be driven into the ground surface.

The rectangular frame is constructed preferably of tubing, to which the wire mesh material 8 is secured, substantially closing the rectangular frame, except for the openings provided by the mesh of the material 8.

The collars 6 are provided with winged nuts 9 whereby the rectangular frame may be adjusted vertically to properly position the rectangular frame and wire mesh material supported thereby with respect to the sweet potatoes which, in the present showing, are indicated by the reference letter A.

Arranged in predetermined spaced relation with respect to each other, throughout the lengths of the side members of the frame 5 are vertical pipes 10 which are formed with indicia indicating inches, the indicia being arranged on the vertical pipes in vertical spaced relation with each other so that they will indicate depth.

Vertically movable collars 11 are positioned on the vertical pipes 10, the collars being arranged in pairs. To each pair of collars is connected a gauge wire 12, the gauge wires 12 being extended transversely of the rectangular frame.

Winged screws 13 extend into the collars 11, and engage the vertical pipes 10, securing the collars 11 in their positions of adjustment.

In the use of the apparatus, the sweet potato bed is provided by digging out a portion of the soil, for a predetermined depth. The sweet potatoes are now planted in rows, and the rectangular frame is positioned so that it rests on the upper surfaces of the sweet potatoes. The corner posts 7 are driven through the collars 6, and the collars 6 secured to the posts.

The collars 11 are now adjusted along the vertical gauge pipes 10 to indicate the proper depth of filling in. The soil is now filled in over the rectangular frame and potatoes.

As the sprouts form and appear above the ground surface, they may be readily pulled from the potatoes, the frame and wire mesh material acting to retain the potatoes in the soil without disturbing the roots, and thereby insuring the continued growth of the sweet potatoes.

From the foregoing it will be seen that due to the construction of the apparatus the sprouts may be readily removed from the potatoes without danger of pulling the potatoes from the soil and impairing the further growth of the potatoes.

It will also be noted that with the present apparatus, the planting of the potatoes at the desired depth to obtain shoots of the proper size will be insured.

Having thus described the invention, what is claimed is:

An agricultural apparatus, comprising a rectangular wire mesh frame embodying vertical tubular sections permanently secured at the corners of the frame, supporting posts having pointed ends for driving into the ground surface, said vertical tubular sections being slidably mounted on the posts, adjustably supporting the wire mesh frame on said posts, means for securing the wire mesh frame in its positions of vertical adjustment on the posts, said wire mesh frame being embedded under the ground surface resting on seed potatoes planted under the ground surface, holding the seed potatoes against displacement, gauge pipes rising from the ends of the frame, vertically movable collars mounted on the gauge pipes and single gauge wire stretched between the collars resting on the ground surface, indicating the depth of soil over the wire mesh material.

MARION ROSCOE POPE.

REFERENCES CITED

The following references are of record in the file of this patent:

UNITED STATES PATENTS

| Number | Name | Date |
|---|---|---|
| 863,620 | Martens | Aug. 20, 1907 |
| 1,055,914 | Hus | Mar. 11, 1913 |
| 1,171,558 | Taylor | Feb. 15, 1916 |
| 1,480,917 | Robinson | Jan. 15, 1924 |
| 1,909,408 | Jones | May 16, 1933 |
| 2,029,343 | Sperr | Feb. 4, 1936 |

FOREIGN PATENTS

| Number | Country | Date |
|---|---|---|
| 155 | Great Britain | 1889 |
| 1,727 | Great Britain | 1892 |